United States Patent [19]

Ito et al.

[11] Patent Number: 5,029,264

[45] Date of Patent: Jul. 2, 1991

[54] RECORDING APPARATUS

[75] Inventors: Noriaki Ito, Yokohama; Akira Torisawa, Machida; Masaaki Kakizaki, Kawasaki, all of Japan

[73] Assignee: Canon Kabushiki Kaisha, Tokyo, Japan

[21] Appl. No.: 413,473

[22] Filed: Sep. 27, 1989

[30] Foreign Application Priority Data

Sep. 27, 1988 [JP] Japan .............................. 63-239704
Dec. 7, 1988 [JP] Japan .............................. 63-307749
Dec. 9, 1988 [JP] Japan .............................. 63-310192

[51] Int. Cl.[5] .............................................. G05B 19/40

[52] U.S. Cl. .................................. 318/685; 318/696; 400/903

[58] Field of Search ................ 318/685, 696; 400/903

[56] References Cited

U.S. PATENT DOCUMENTS 4,602,882 7/1986 Akazawa ............................ 400/322
4,706,008 11/1987 Cronch et al. ...................... 318/696
4,794,292 12/1988 Torisawa ........................... 310/257
4,897,589 1/1990 Fujiwara et al. .................. 318/685
4,928,050 5/1990 Torisawa et al. .................. 318/696
4,963,808 10/1990 Torisawa et al. .................. 318/685

*Primary Examiner*—William M. Shoop, Jr.
*Assistant Examiner*—Saul M. Bergmann
*Attorney, Agent, or Firm*—Fitzpatrick, Cella, Harper & Scinto

[57] ABSTRACT

The present invention provides a recording apparatus wherein recording is performed by reciprocably shifting a carriage on which a recording head is mounted by means of a stepping motor and which comprises a rotational position detection device for detecting a rotational position of a rotor of the stepping motor, and a control unit for performing a closed loop control for the change-over timing of excitation currents to coils of the stepping motor and for the driving speed of the stepping motor, on the basis of the detection signal from the rotational position detection device, and judges whether the initial drive of the stepping motor and the change-over timing are normal, through the control unit.

15 Claims, 15 Drawing Sheets

RECORDING APPARATUS

BACKGROUND OF THE INVENTION

1. Field of the Invention

The present invention relates to a recording apparatus, and more particularly, it relates to a recording apparatus of the serial type, wherein at least a recording head is shifted by a stepping motor as a driving source to scan for a recording operation.

2. Related Background Art

In a conventional recording apparatus of serial type, a hybrid stepping motor or a PM (permanent magnet) stepping motor or a brushless motor has been used as a carriage driving motor for shifting a recording head to scan for a recording operation.

For example, in the brushless motor, generally, for example Hall elements have been used for detecting positions of magnetic poles of a rotor to perform an electric control, and an optical or magnetic encoder has been used for detecting the speed of the rotor.

However, such a conventional brushless motor has the following drawbacks:

(1) It is required that magnetic poles of a stator are correctly positioned with respect to the Hall elements; and (2) Since the positions of the Hall elements and of the stator are determined unconditionally when the current change-over is effected by the Hall elements, a method for supplying current to the motor is limited to only one way. For example, since in case of a so-called 180° electric control, the positions of the Hall elements regarding the magnetic poles of the stator differ by 45° electrically from those in the case of a so-called 90° electric control, if two kinds of electric controls are effected by a single motor, the number of the Hall elements will be increased twice and all of the Hall elements must be arranged in positions suitable for performing the respective electric controls.

Incidentally, the Japanese Patent Laid-Open Nos. 62-193548 and 62-193549 disclose a stepping motor wherein an electric control is effected by utilizing an encoder. However, these Patent Applications merely disclose the structure of the stepping motor itself including the encoder arranged in a predetermined position, but do not disclose or teach the control circuit or method for driving the stepping motor.

Now, the Applicant has proposed, in the U.S. Pat. Ser. No. 259,259 filed on Oct. 18, 1988, a control apparatus for a stepping motor wherein an encoder having detected portions the number of which is larger by a few times than that of the magnetic poles of the rotor is fixedly mounted on a shaft of the rotor, and when the rotor is rotated the number of the detected portions on the encoder passing through a predetermined position situated at the stator side is counted so that when the counted number coincides with a predetermined value the electric supply to the coil of the stator is initiated.

Conventionally, the drive control for the stepping motor has merely been performed by an open loop control treating the number of driving pulses of the stepping motor and the frequency of such pulse.

However, if the stepping motor is used as the carriage driving motor and the stepping motor is driven by the open loop control, during the movement of the carriage, discordant noise is generated due to the vibration of the rotor of the stepping motor, particularly, the hybrid stepping motor. Further, upon start, stop and reverse of the carriage, and accordingly, upon start, stop and reverse of the stepping motor, since the stepping motor is started o stopped with vibration, large noise is also generated. These noises must be avoided, particularly in an ink jet printer such as a bubble jet printer which generates no substantial noise.

Further, it can be considered that the above-mentioned brushless motor is used as the carriage driving motor. In this case, however, since the brushless motor has a long starting-up time upon start of the motor, it is not suitable for the carriage driving motor which requires the start, stop and reverse of the motor for each printing (recording) line, and therefore, the high speed printing or recording cannot be attained by the use of the brushless motor.

Now, in the U.S. Pat. Ser. No. 302,196 filed on Jan. 27, 1989, a recording apparatus has been proposed wherein the stepping motor is used as a driving source for shifting a recording head to scan for a recording operation and comprises a detecting means for an angular position of the rotor of the stepping motor, and a control means for closed-loop controlling the drive of the stepping motor in accordance with the detected result from the detecting means.

However, in order to closed-loop control the stepping motor, it is necessary to provide an encoder for detecting the angular position of the rotor of the stepping motor and it is also necessary to register the positions of the magnetic poles of the rotor with the positions of the magnetic poles (slits in the magnetic or optical system) of the encoder during assembling of the stepping motor. The reason why such registration of positions between the magnetic poles of the rotor and those of the encoder is required is that the phase change-over of the stepping motor must be synchronous with the output pulses of the encoder. If such positional registration is not obtained with high accuracy, the motor will not be rotated or will have different rotational speeds in opposite directions.

On the other hand, if the number of pulses generated during one revolution of the encoder is increased to improve the resolving power for each pulse, such positional registration will not be required. For example, in a PM stepping motor in which one revolution is achieved by 48 steps, the number of the magnetic poles of the rotor is 24 (twenty-four). In this case, if the number of the output pulses of the encoder is 288 for each revolution, the output having 12 (twelve) pulses can be obtained for each magnetic pole of the rotor. If the encoder is fixedly mounted on the shaft of the rotor at random, since the deviation between the center of the magnetic poles of the rotor and the center of the magnetic poles of the encoder corresponds to a half of a distance of two adjacent pulses at the most, such deviation will be included in the range of $\pm 4.2\%$. In this case, the deviation in the change-over timing of the exciting current can be negligible.

However, in this case, it must be determined which magnetic pole of the encoder corresponds to the particular magnetic pole of the rotor. To this end, first of all, the current is supplied to the coils of the motor for a predetermined time or more. Then, when the rotor of the motor is slightly rotated by the energization of the coils due to such current supply and then is stopped, the magnetic pole in the encoder which is registered with the magnetic pole of the rotor is selected. The other magnetic poles in the encoder may be selected at intervals of twelve pulses on the basis of the firstly selected magnetic pole.

The initialization of the encoder as mentioned above must be effected prior to the action of the stepping motor. That is to say, when such stepping motor is used as the carriage driving motor for a serial printer, it is necessary to initialize the encoder before the printer is powered on.

However, since it is not ascertained where the carriage of the printer is positioned or stopped after the power source is turned OFF, the initializing operation can not often be performed correctly. For example, if the carriage is stopped at the right or left margin of its travel, or if the carriage is not further moved (and, thus, the motor can not be further rotated) in spite of the fact that some of the phases of the motor is energized for the initialization, or if the rotor is in a dead point (where an electric angle is deviated from the normal position by 180° and the torque is zero), the initialization will be effected in a condition that the position of the rotor is not correctly set, with the result that the motor cannot be driven or may be overrun.

Further, when the stepping motor is driven or the rotor of the motor is held to perform the above-mentioned initializing operation, since the motor driving voltage is applied to the stepping motor as it is, it is feared that the excessive current flows through the stepping motor. To avoid this phenomenon, conventionally, a current control circuit as shown in FIG. 15 was prepared to limit the current in the motor drive operation and the rotor holding operation. Incidentally, in FIG. 15, the reference numeral designates a motor drive circuit.

However, when such current control circuit is incorporated, the construction of the motor drive circuit will be complicated, thus increasing the manufacturing cost, the number of parts, space of the substrate or the like.

SUMMARY OF THE INVENTION

An object of the present invention is to eliminate the above-mentioned conventional drawbacks and to positively and correctly perform the initializing operation in the closed loop control of the stepping motor.

Another object of the invention is to be able to confirm or ascertain the fact that the initializing operation has been performed.

A further object of the invention is to perform the initialization of the stepping motor by the use of the current control with pulse width modulation.

Other objects of the present invention will be apparent from the following description regarding embodiments of the invention.

DETAILED DESCRIPTION OF THE PREFERRED EMBODIMENTS

The present invention will now be explained in connection with embodiments thereof with reference to the accompanying drawings.

FIGS. 1–5 show a construction and an operation of the portions associated with a first embodiment of the present invention, of a serial ink jet printer.

Figure 1:
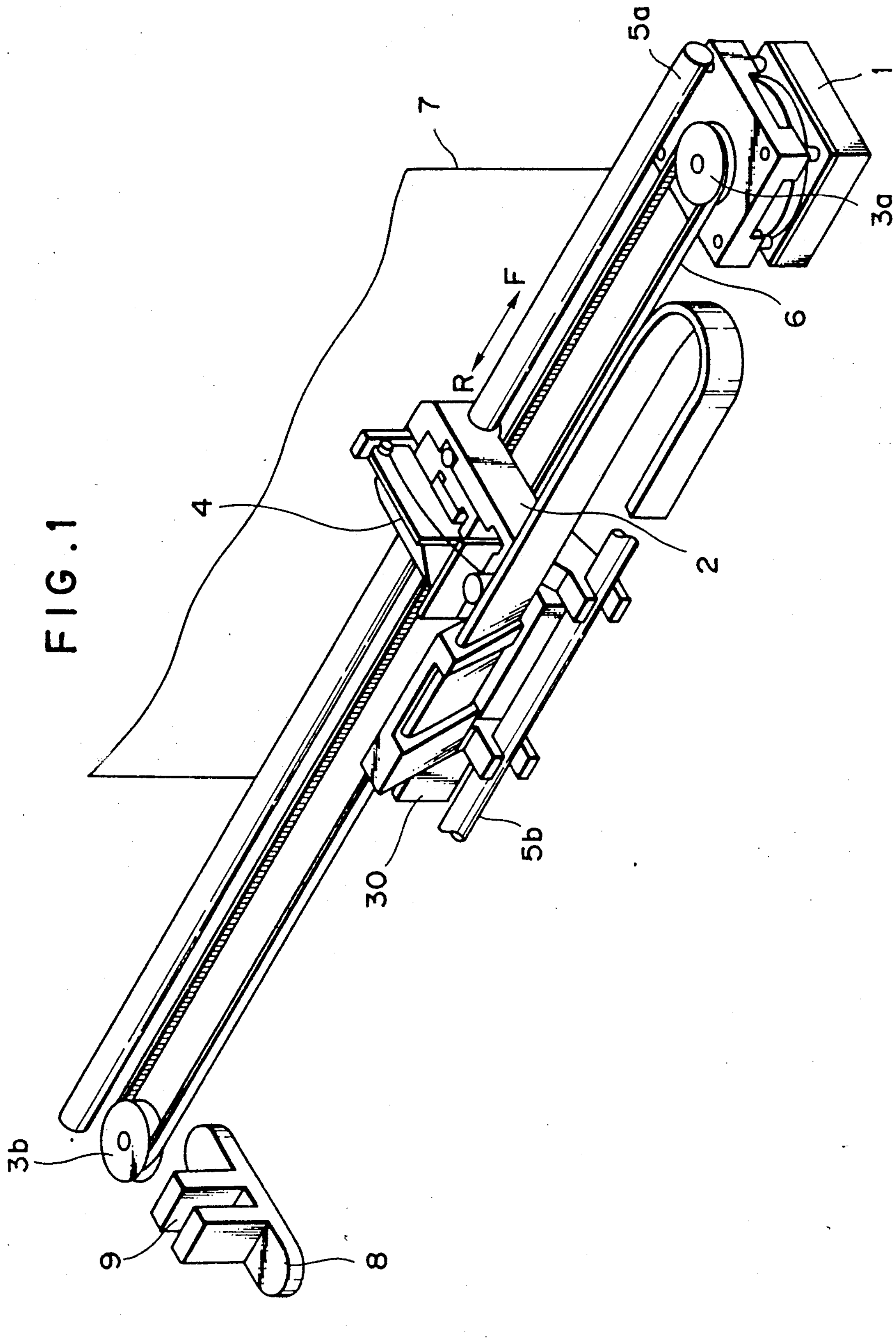
FIG. 1 is a perspective view of a carriage driving mechanism according to a first embodiment of the present invention.

First of all, FIG. 1 shows a construction of a carriage driving mechanism which constitutes an essential part of the printer according to the first embodiment and by which a carriage having a recording head mounted thereon is driven. In FIG. 1. a recording head 4 of ink jet type is mounted on a carriage 2 which is slidably supported by guide shafts 5*a*, 5*b* fixed to a printer frame (not shown) in parallel with a platen (not shown) around which a recording sheet 7 is fed. Further, the carriage 2 is connected to an endless belt 6 which extends between pulleys 3*a* and 3*b* one of which (i.e., the pulley 3*a*) is operatively coupled to an output shaft of a carriage driving motor 1.

When the pulley 3*a* is rotated by energizing the carriage driving motor 1, the belt 6 is turned or rotated to shift the carriage 2 along the guide shafts 5*a*, 5*b* in a direction F or R in front of the recording sheet 7. While the carriage 2 is shifted to the direction F or R, the recording head 4 is driven to perform the dot recording by one line. After the one line recording is completed, the recording sheet 7 is fed upwardly (in the FIG. 1) by one line space. By repeating such cycles, the images or characters are recorded on the recording sheet 7 successively line by line. A recording position and a carriage position can be judged by counting the number of encoder signals on the basis of a reference position or zero position where a shield plate 30 of the carriage is inserted into a slit 9 of a photosensor 8.

Incidentally, in this recording operation, the driving condition required for the carriage driving motor 1 is, for example, that when the recording density is 360 dot/inch the rotational speed of the carriage driving motor 1 corresponding to the recording speed is about 800 rpm in a high speed mode and about 400 rpm in a low speed mode. In the high speed mode, it takes about 60 msec from the start of the motor to the constant rotation (800 rpm) of the motor, and the time duration of the constant rotation is about 1 second. Further, it takes about 60 msec from the constant rotation to stop the motor.

Figure 2:
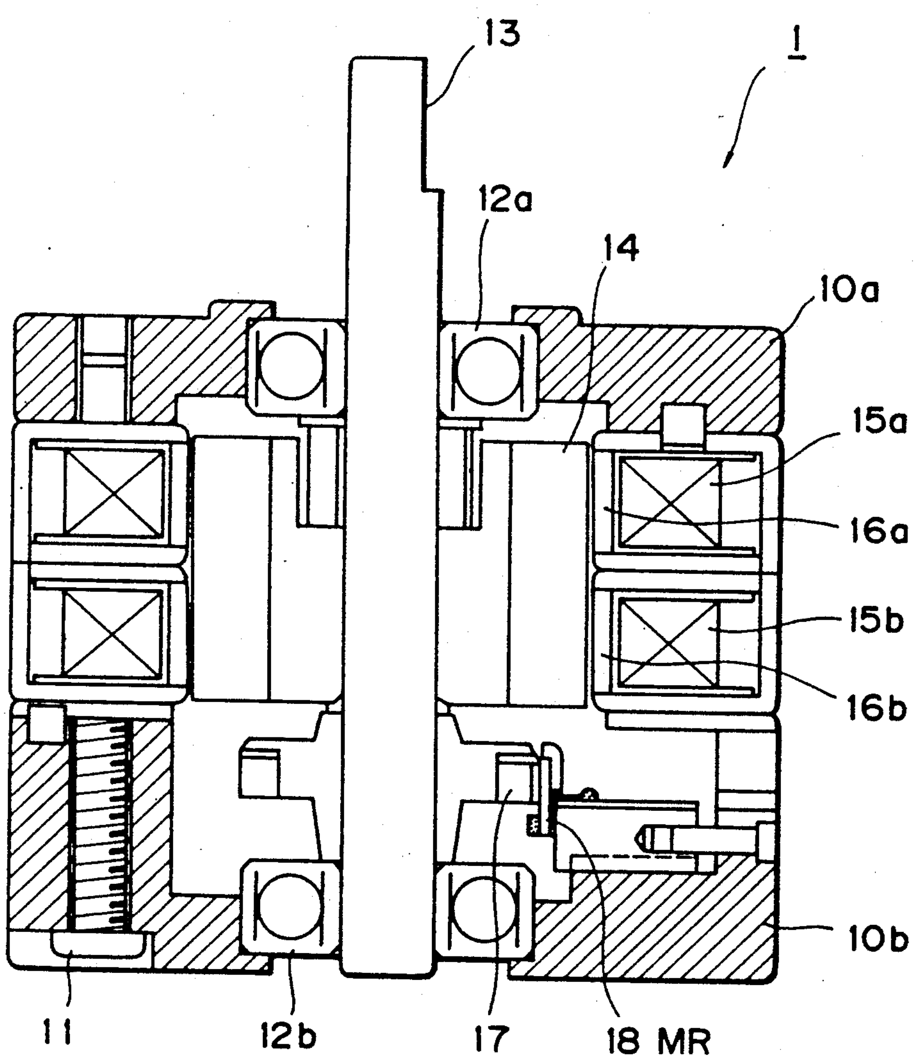
FIG. 2 is a sectional view showing an internal structure of a carriage driving motor of FIG. 1.

FIG. 2 is a sectional view showing the construction of the carriage driving motor 1 according to the first embodiment driven in accordance with the above driving condition. The carriage driving motor 1 comprises bodies 10*a* and 10*b* for supporting the whole motor, which are interconnected by screws 11 and the like in confronting relation to each other in an up-and-down direction.

A rotor shaft 13 as an output shaft of the motor 1 is rotatably supported by the bodies 10*a* and 10*b* through bearings 12*a* and 12*b*, respectively. A rotor 14 consisting of a cylindrical permanent magnet is fixedly mounted on a central portion of the rotor shaft 13. On an outer peripheral surface of the rotor 14, magnetic poles having N and magnetic poles having S are fixedly arranged alternately at equidistant intervals (in this case, for example, 24 N-magnetic poles and 24 S-magnetic poles are used).

Further, around the rotor 14, two ring-shaped stators 16*a* and 16*b* each on which coils 15*a* and 15*b* are wound respectively are fixedly arranged between the upper and lower bodies 10*a* and 10*b* in confronting relation to each other in the up-and-down direction, in such a manner that the rotor 14 is freely received in the central openings of the stators. Incidentally, on inner surfaces of the stators 16*a* and 16*b* opposed to the outer peripheral surface of the rotor 14, magnetic poles are fixedly arranged at the same intervals or pitches as those of the rotor 14, respectively. The magnetic poles on the stator 16*a* is deviated from the magnetic poles on the stator 16*b* by ¼ of the pitch between the poles.

With this arrangement, by changing over the excitation currents of the coils 15*a* and 15*b* with a single phase excitation, attraction and repulsion due to the magnetic force between each magnetic pole of the stators 16*a*, 16*b* and each magnetic pole of the rotor 14 are repeated, thereby rotating the rotor 14 together with the rotor shaft 13. Therefore, in this example which uses 24 N-magnetic poles and 24 S-magnetic poles on the rotor 14, by changing over the excitation currents by 48 times, the rotor 14 can be rotated by one revolution.

Incidentally, since the magnetic poles on the stator 16*a* is deviated from those on the stator 16*b* as mentioned above, by reversing the excitation order for the stators 16*a*, 16*b*, the rotor can be rotated in either direction.

The fundamental construction of the above mentioned carriage driving motor 1 is the same as that of the conventional PM stepping motor. However, in the illustrated embodiment, the carriage driving motor 1 has not only such fundamental construction, but also an encoder for detecting the position of each magnetic pole of the rotor 14 (i.e., for detecting the angular position of the rotor) in order to obtain low noise and high speed operation.

The encoder (25 in FIG. 3) comprises a detection disc 17 fixed to the rotor shaft 13, and an MR element (magnetic resistive element) substrate 18 fixed to the body 10*b* in confronting relation to an outer periphery of the disc. On the outer periphery of the detection disc 17, N-magnetic poles and S-magnetic poles are fixedly arranged alternately at equidistant pitches (in this embodiment, for example, 144 magnetic poles are used). Further, although not shown in the drawings, on a surface of the MR element substrate 18 opposed to the detection disc 17, two MR elements are arranged adjacent to each other and deviated slightly in a circumferential direction of the disc.

As the disc 17 is rotated by the rotation of the rotor 14, since whenever the magnetic pole of the disc 17 passes in front of the two MR elements of the MR element substrate 18 the pulse signals having phases deviated from each other by 90° are outputted from the encoder as encoder outputs through both MR elements, by using 144 magnetic poles on the detection disc 17 as mentioned above, 288 encoder pulses can be obtained for each one revolution of the rotor 14. Incidentally the reason why the pulses having the phases deviated from each other by 90° through both MR elements is to also permit to detect the direction of rotation of the rotor 14.

In the illustrated embodiment, more particularly, in order to closed-loop control the operation of the carriage driving motor 1 in response to such detected outputs from the encoder, the control for changing over timing of the excitation currents of the coils 15*a*, 15*b* of the carriage driving motor 1 and the control of the motor are performed.

Figure 3:
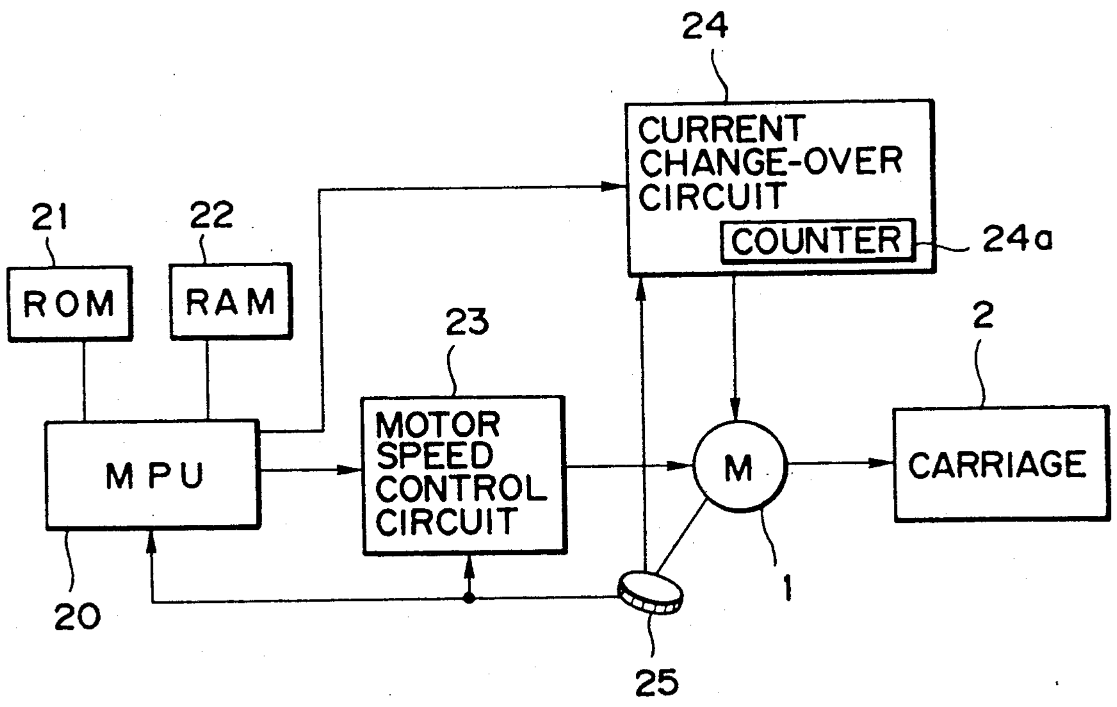
FIG. 3 is a block diagram showing the construction of a drive control system for the motor of FIG. 1.

FIG. 3 shows the construction of a motor drive control system for controlling the motor driving motor 1 with the closed loop control.

The reference numeral 20 designates an MPU (microprocessor unit) for controlling the whole printer, which MPU controls the operation of driving sources of other mechanisms (not shown) of the printer, by using a RAM (random access memory) 22 to treat the data, on the basis of a control program stored in a ROM (read only memory) 21, and also controls the operation of the carriage driving motor 1 for driving the above-mentioned carriage 2. To this end, the MPU 20 is designed to detect the position of the carriage 2 by counting the output pulses from the encoder 25 comprising the detection disc 17 and the MR element substrate 18 by the use of a counter constituted by hardware or software (not shown).

Further, the MPU 20 controls the rotational speed of the carriage driving motor 1 to the speed in the above-mentioned high speed mode or low speed mode, through a motor speed control circuit 23, and also controls the start, stop and rotational direction of the carriage driving motor 1 (and, accordingly, the start, stop and moving direction of the carriage 2) by changing over the excitation currents of the coils 15*a*, 15*b* of the carriage driving motor 1 through a current change-over circuit 24 for driving the carriage driving motor.

The motor speed control circuit 23 controls the rotational speed of the carriage driving motor 1 with the closed loop control, on the basis of the detected outputs from the encoder 25, and more particularly, it compares the time duration between the output pulses of the encoder 25 with a reference time, and increases or decreases the magnitude of the excitation current (or voltage) for the carriage driving motor 1 to minimize the difference between the above times on the basis of the comparison result.

The MPU 20 commands the rotational speed of the carriage driving motor 1 to the motor drive control circuit 23. In response to this command, the reference time (used for comparison) corresponding to the commanded speed is selected in the motor drive control circuit 23. The time duration between the pulses is compared with such reference time, whereby the rotational speed of the carriage driving motor 1 is controlled, for example, to a predetermined high speed mode or a predetermined low speed mode.

On the other hand, the current change-over circuit 24 starts change-over operation of the above-mentioned excitation currents in response to a start signal inputted from the MPU 20 to start the carriage driving motor 1, and stops the carriage driving motor 1 in response to a stop signal inputted from the MPU 20.

Further, the current change-over circuit 24 according to the invention controls the change-over timing for the excitation currents of the coils of the carriage driving motor with the closed loop control fashion, in response to the detected outputs of the encoder 25. To this end, the current change-over circuit 24 includes a counter 24a by which the output pulses of the encoder 25 are counted, whereby, whenever the counted value coincides with a predetermined value, the excitation currents are changed over.

As mentioned above, in the illustrated embodiment, the current change-over circuit for the carriage driving motor 1 is of the 2-phase-on drive type wherein the currents are changed over by 48 times for each one revolution of the rotor 14, and the encoder 25 provides 288 output pulses for each one revolution thereof. Since whenever each pulse is outputted the rotor 14 is rotated by the same angle, if the excitation currents are changed over whenever six (288÷48) pulses are counted, the excitation currents can always be changed over at a predetermined timing where a predetermined relation between the positions of the magnetic poles of the rotor 14 and the positions of the magnetic poles of the stators 16a, 16b is always the same and is repeated per each predetermined angular rotation of the rotor.

Next, the control operation for the carriage driving motor 1 performed by using the MPU 20 in the recording operation will be explained with reference to FIG. 4. Incidentally, here, the explanation regarding the control operation for the other mechanisms by means of the MPU 20 will be omitted.

Figure 4:
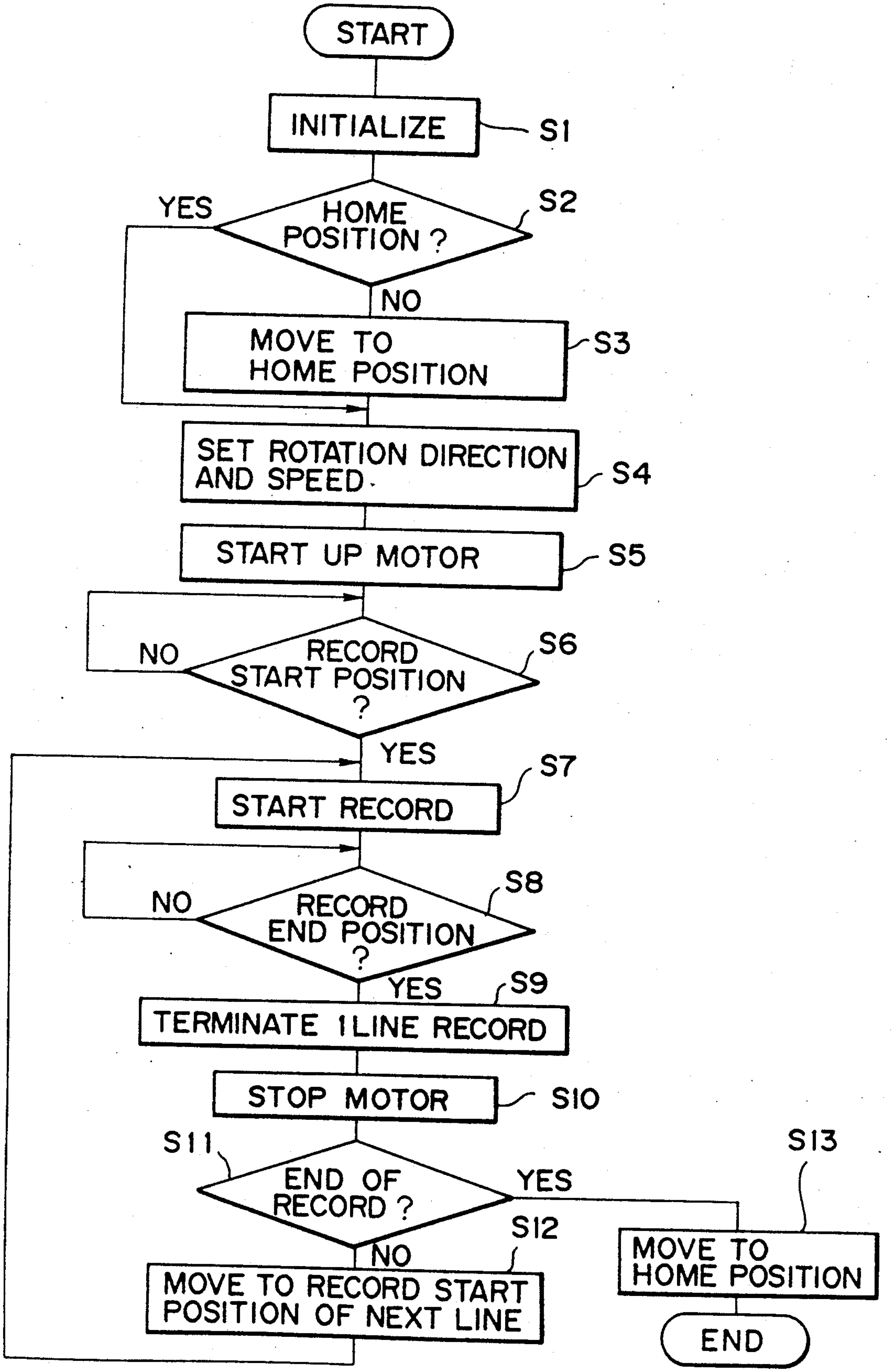
FIG. 4 is a flow chart showing a control sequence for the carriage driving motor of FIG. 1.

FIG. 4 shows a sequence for drive control of the carriage driving motor 1 performed by the MPU 20, and the control program executing this sequence is stored in the ROM 21.

When the printer is powered on, in a step S1 of FIG. 4, the MPU 20 performs the initialization operation for correctly corresponding the position of the above-mentioned rotor 14 to the counted value counted by the counter 24a of the current change-over circuit 24, which will be described later.

Next, in a step S2, the photosensor 8 judges whether the carriage 2 is in a home position (left end position in FIG. 1) or not; and, if not, in a step S3, the carriage driving motor 1 is driven to shift the carriage 2 to the home position.

Next, in a step S4, the MPU 20 determines or sets the rotational direction and rotational speed of the motor 1 on the basis of a recording mode indicated by a host system (not shown) and determines the number of the driving pulses for the carriage driving motor 1 on the basis of the number of characters in one line.

Then, the MPU outputs a command signal for indicating the rotational speed of the motor to the motor drive control circuit 23, and drives the current change-over circuit 23 to start up the carriage driving motor 1 in a step S5, thus initiating the movement of the carriage 2. Further, at the same time as the carriage driving motor 1 is started up, the MPU 20 starts to count the output pulses of the encoder 25.

Next, in a step S6, the MPU 20 judges whether the carriage 2 reaches a recording start position on the basis of the counted value of the output pulses of the encoder 25. If the carriage 2 has reached the record start position, in a step S7, the recording head 4 is driven to start the recording operation.

Next, in a step S8, the MPU judges whether the carriage reaches a recording end position where one line recording is completed, on the basis of the counted value of the output pulses of the encoder 25. If the carriage has reached the recording end position, in a step S9, the recording head 4 is deactivated to complete the one line recording operation. Then, in a step S10, the MPU outputs a stop signal to the current change-over circuit 24, with the result that the current change-over circuit 24 short-circuits between both ends of the coils of the carriage driving motor 1 in response to the stop signal, thus stopping the carriage driving motor 1.

Next, in a step S11, the MPU 20 judges whether the whole recording is ended or not, on the basis of the presence of the residual amount of the recording data.

If the whole record has been ended, the sequence goes to a step S13, where the carriage 2 is returned to the home position by driving the carriage driving motor 1, thus completing the sequence.

On the other hand, if the whole record has not yet been ended and there remains the recording data for the next line, the sequence goes to a step S12, where the carriage 2 is shifted to the record start position of the next line by driving the carriage driving motor 1, and then the sequence returns to the step S7, from where the above-mentioned processes are repeated.

Incidentally, when the recording operation is performed in both directions (reciprocal recording), the above-mentioned record start position of the next line will be a right end of said next line. Further, it should be noted that, when the carriage 2 is shifted to the reverse direction (direction R in FIG. 1) by reversing the rotational direction of the carriage driving motor 1, the position of the carriage 2 is detected by rearwardly counting (deducting) the output pulses of the encoder 25.

Next, the initializing operation in the illustrated embodiment will be explained.

Figure 5:
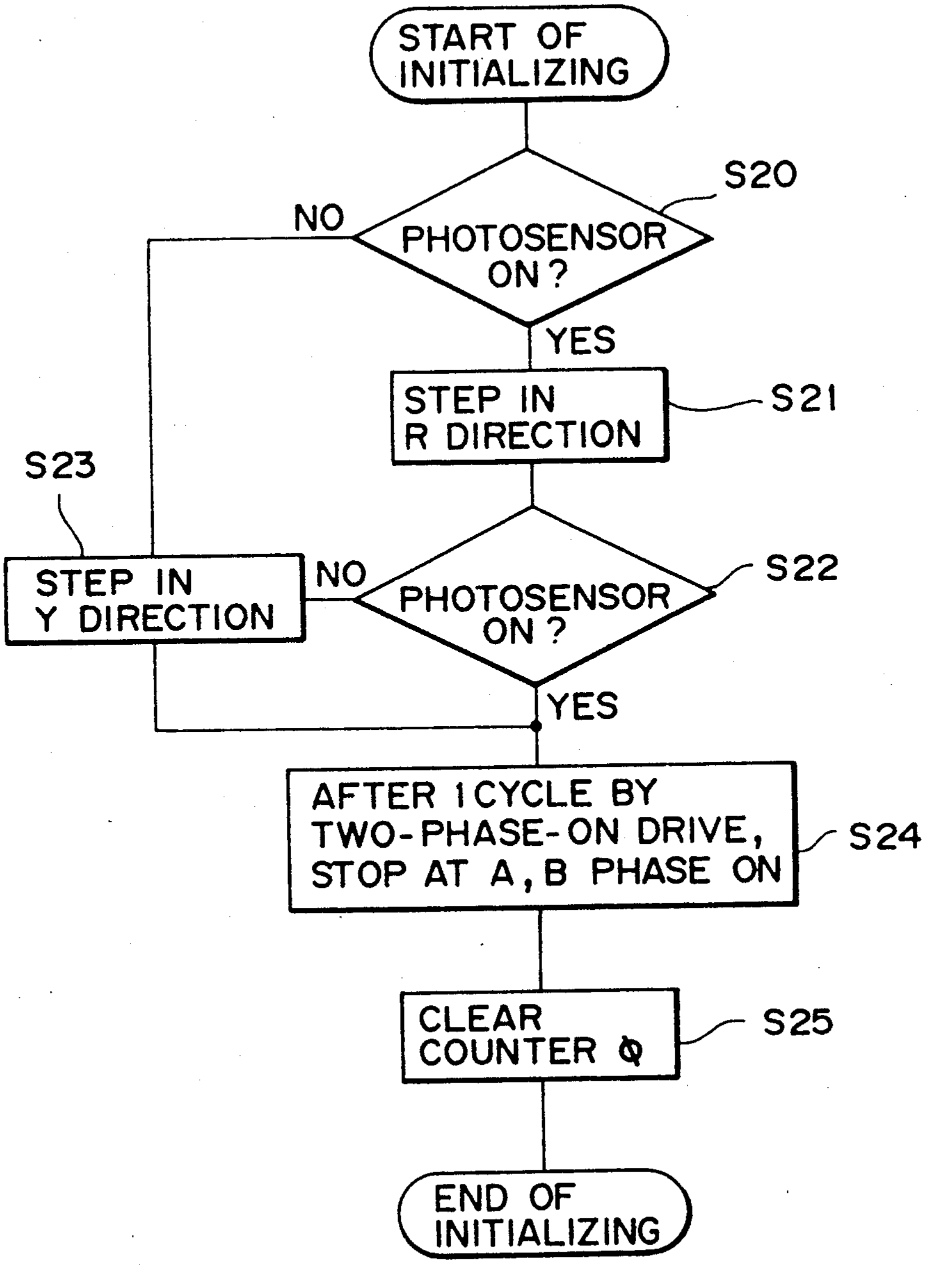
FIG. 5 is a flow chart showing the sequence of the initializing operation for the carriage driving motor of FIG. 1.

FIG. 5 shows a flow chart for the initializing operation. As mentioned above, since it is not known where the carriage is positioned when the power source is turned ON, first of all, the carriage must be moved to a position where the initializing operation can be performed without fail.

By the way, in the serial printer to which the present invention is applied, although the stepping motor is controlled with the closed loop fashion to act as the multiple pole brushless motor, it is possible to drive the stepping motor to perform the inherent function of the stepping motor itself. To this end, the current change-over circuit 24 may include a stepping motor drive pattern generating circuit incorporated therein, by which the motor 1 is driven in synchronous with the signal from the MPU 20. Alternatively, the MPU 20 may send the drive pattern to the current change-over circuit to drive the motor. In this way, by incorporating both the function of the brushless motor and the inherent function as the stepping motor itself into the carriage driving motor, the carriage can be moved even before the initializing operation for the motor control is performed.

Now, in order to judge whether the carriage is near the home position or not for correcting the position, the output of the photosensor 8 is checked (in a step S20), because if the carriage is near the home position (left end in FIG. 1) the shield plate 30 of the carriage is overlapped with the slit 9 of the photosensor 8 to shut off the light emitted from an LED in the photosensor, thus making the output of the photosensor OFF. In this case, the carriage is steppingly shifted to the direction F (FIG. 1) enough to clear the shield plate from the slit of the photosensor (in a step S23).

When the output of the photosensor is ON, there is at least carriage movable area at the left side of the carriage. However, since it is not known whether there remains a carriage movable area at the right side of the carriage, firstly, the carriage 2 is steppingly moved to the direction R (left) (in a step S21). Thereafter, the carriage is moved to the right (direction F) enough to clear the shield plate 30 from the slit of the photosensor as mentioned above (in a step S22). Then, when the output of the photosensor becomes ON, there will remain adequate carriage movable areas at both sides of the carriage.

In this way, the carriage is in a condition that it can be moved in either direction.

Next, the positions of the magnetic poles of the rotor is registered with the positions of the magnetic poles of the encoder. While the condition for registration of position was not described previously, in fact, there is an appropriate desirable relation capable of smoothly and desirably driving the motor. Here, for example, by assuming that the change-over operation of the excitation currents is preferably performed when the center (position having the strongest magnetic force) of each magnetic pole of the rotor 14 coincides with the center of each magnetic pole of one of the stators **16*a*, 16*b***, i.e., when the driving torque is zero, the above-mentioned initializing operation is performed as follows:

That is to say, the motor is driven with a drive pattern of one phase excitation, i.e., one-phase-on drive by one cycle or two cycles (in case of the one-phase-on drive, one cycle corresponds to four steps) (in a step S24). This operation helps to release the carriage if the latter is stopped at the dead point of the motor. Then, when the last step drive of the motor is completed, after the excitation condition are held for a while, the value of the above-mentioned counter controlling the change-over timing of the excitation currents is set to zero, thus shutting off the excitation current (in a step S25). The reason why there remains a time duration between the last step and the clear of the counter is that the vibration of the rotor is diminished to be able to correctly position the rotor. Alternatively, such process may be performed with two-phase-on drive or with half-step drive. In such a case, the initial value of the counter is set to a predetermined value.

With such initialization, the magnetic poles of the rotor are coordinated with the magnetic poles of the encoder, and the process for the change-over timing of the excitation currents is also prepared. Incidentally, once the initializing operation has been performed, such coordinated relation is maintained so long as the printer is not powered OFF.

According to the present invention as mentioned above, the initializing operation of the carriage driving motor can be positively performed by the home position sensor and the drive of the stepping motor as mentioned above, whereby it is possible to stably control the motor with the closed loop fashion. Accordingly, the carriage control without vibration and uneven speed can be realized.

Next, a second embodiment of the present invention will be explained with reference to FIGS. 6 and 7.

In the second embodiment, the means for detecting the position of the carriage comprises a switch mechanism 26 arranged at the margin of the carriage travel. The switch mechanism 26 is so designed that when the carriage reaches the margin of its travel the carriage pushes a switch arm (not numbered), thus turning the switch ON.

Next, the operation sequence of the second embodiment will be explained with reference to FIG. 7. It should be noted that the fundamental operation is the same as that of the first embodiment. However, when the carriage is in the margin of its travel, the condition of the means for detecting the position of the carriage is different ("OFF" in the first embodiment, whereas "ON" in the second embodiment).

Figure 6:
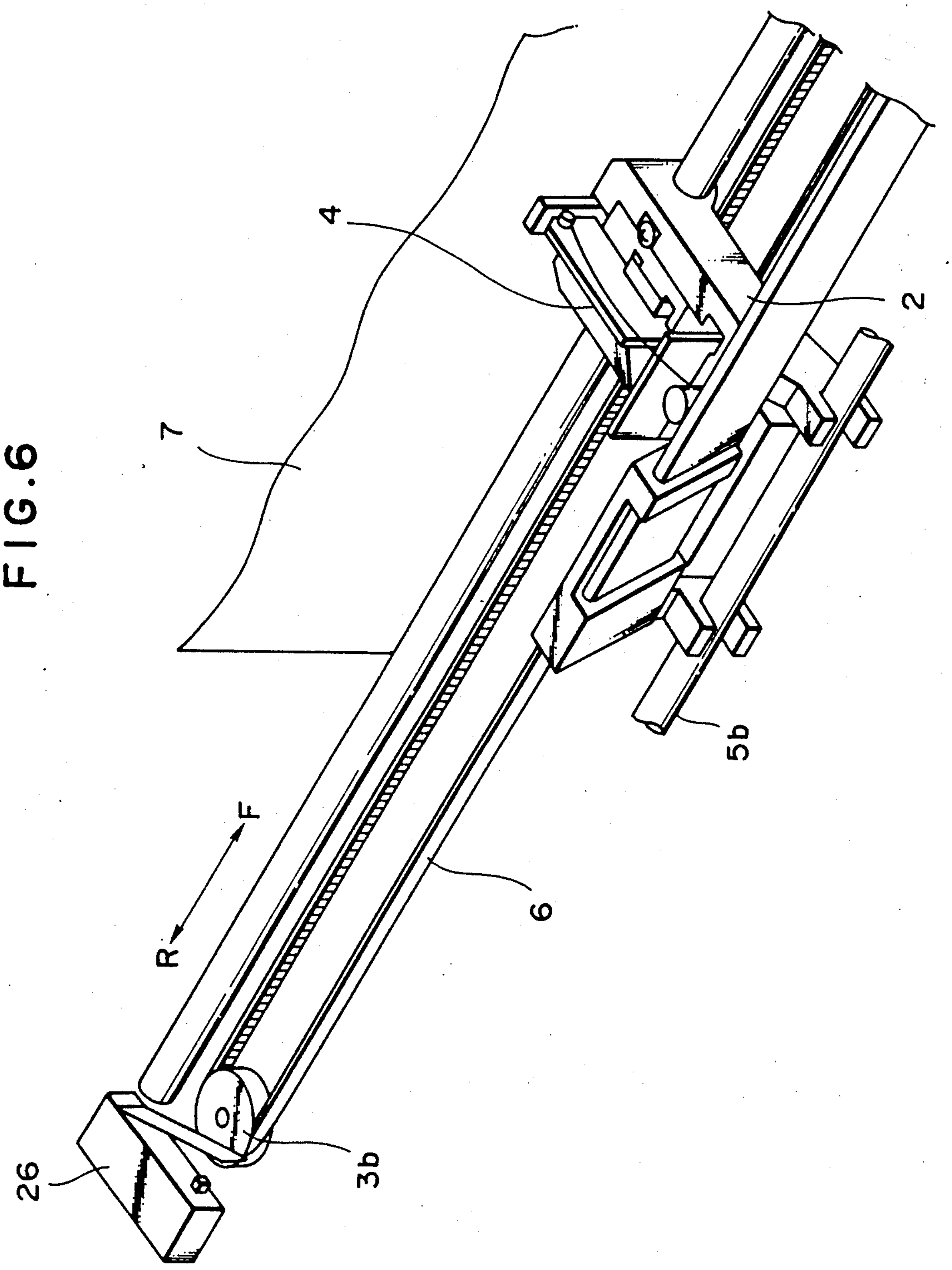
FIG. 6 is a perspective view of a carriage driving mechanism according to a second embodiment of the present invention.
Figure 7:
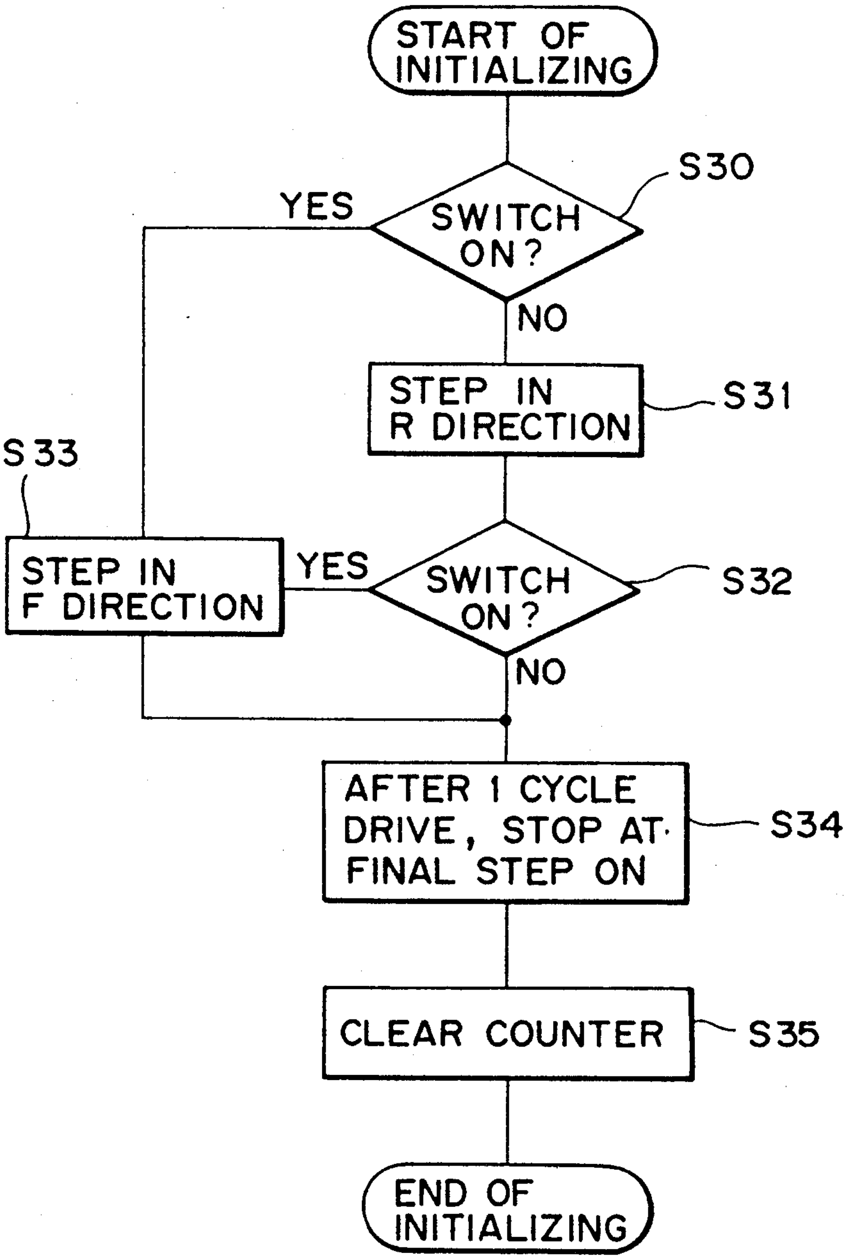
FIG. 7 is a flow chart showing the sequence of the initializing operation for the carriage driving motor of FIG. 6.

In FIG. 6, while the switch 26 is arranged in the left margin, of course, it may be arranged at the right margin. In such a case, it should be noted that the indication of the direction (R, F) in the flow chart of FIG. 7 will be reversed (refer to steps S31 and S33). Further, the switch 26 may not include the switch arm.

Figure 8:
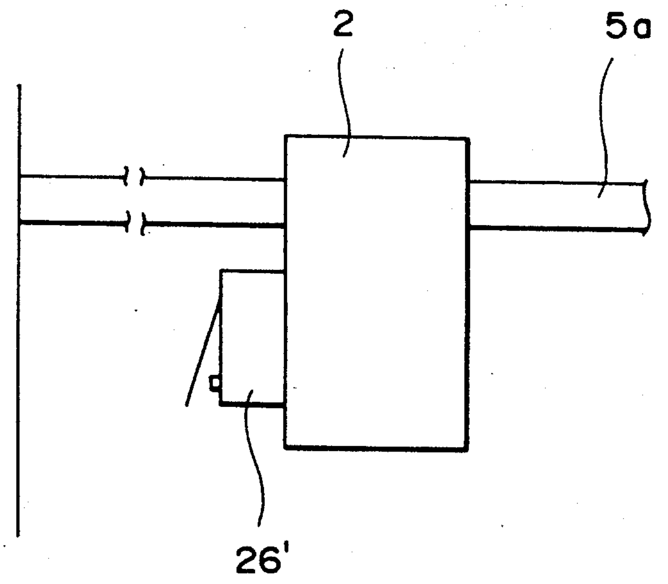
FIG. 8 shows an alteration of a position detecting mechanism of the second embodiment.

According to an alteration shown in FIG. 8, a switch 26' constituting the means for detecting the position of the carriage is arranged on the carriage. In this case, the initializing operation can be executed also in accordance with the flow chart shown in FIG. 7.

In a recent printer which is compact, since the space in the carriage shifting direction is often limited or restricted, the switch mechanism not requiring the switch attaching space is effective. The switch 26' may be attached to the right side of the carriage. In such a case, it should be noted that the indication of the direction (R, F) in the flow chart of FIG. 7 will be reversed (refer to steps S31 and S33).

Incidentally, the switch 26 or 26' can act as a fail safe mechanism for the carriage, because, if the carriage is moved out of the normal moving area, the carriage can be prevented from striking against the frame of the recording apparatus by turning the switch ON to shut off the motor current.

Next, a third embodiment of the present invention will be explained, and, in particular, the difference between the third embodiment and the first embodiment will be mainly explained.

Figure 9A:
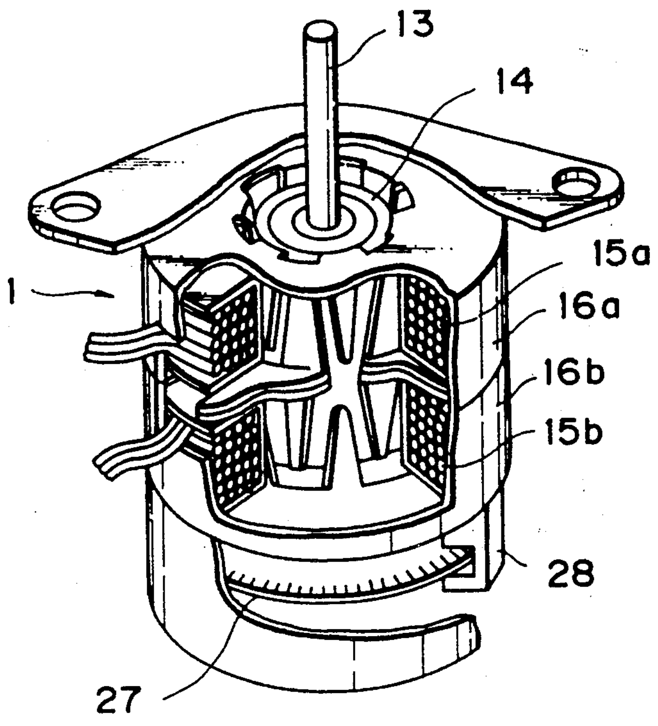
FIG. 9A is a perspective view, partially broken, of a carriage driving motor according to a third embodiment of the invention.
Figure 9B:
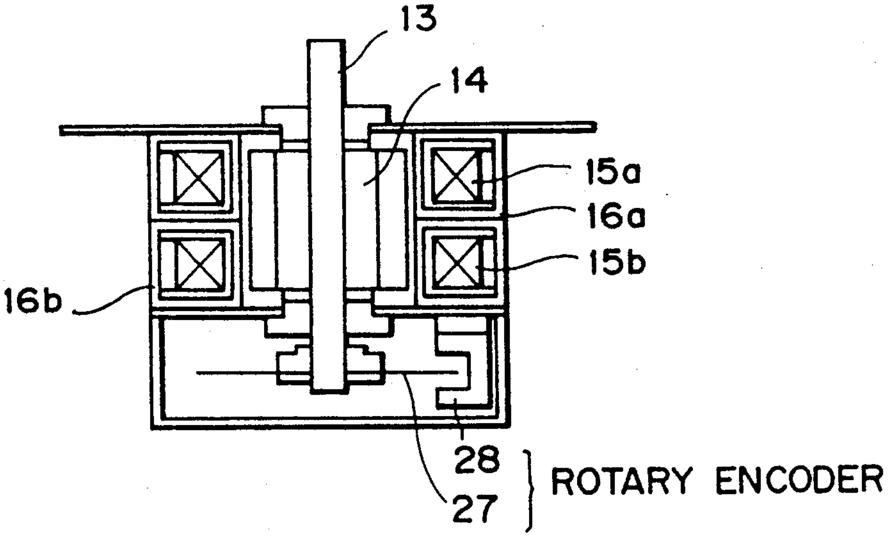
FIG. 9B is a sectional view of the motor of FIG. 9A.

FIGS. 9A and 9B show a carriage driving motor according to the third embodiment, wherein the encoder associated with the motor is different from that of FIG. 2. In this third embodiment, a detection disc 27 is coaxially fixed to the rotor shaft 13, and a photo-interrupter 28 is arranged at the side of the stators. In this way, by counting the output pulses from a rotary encoder constituted by the detection disc 27 and the photointerrupter 28, the detection can be performed.

Figure 10:
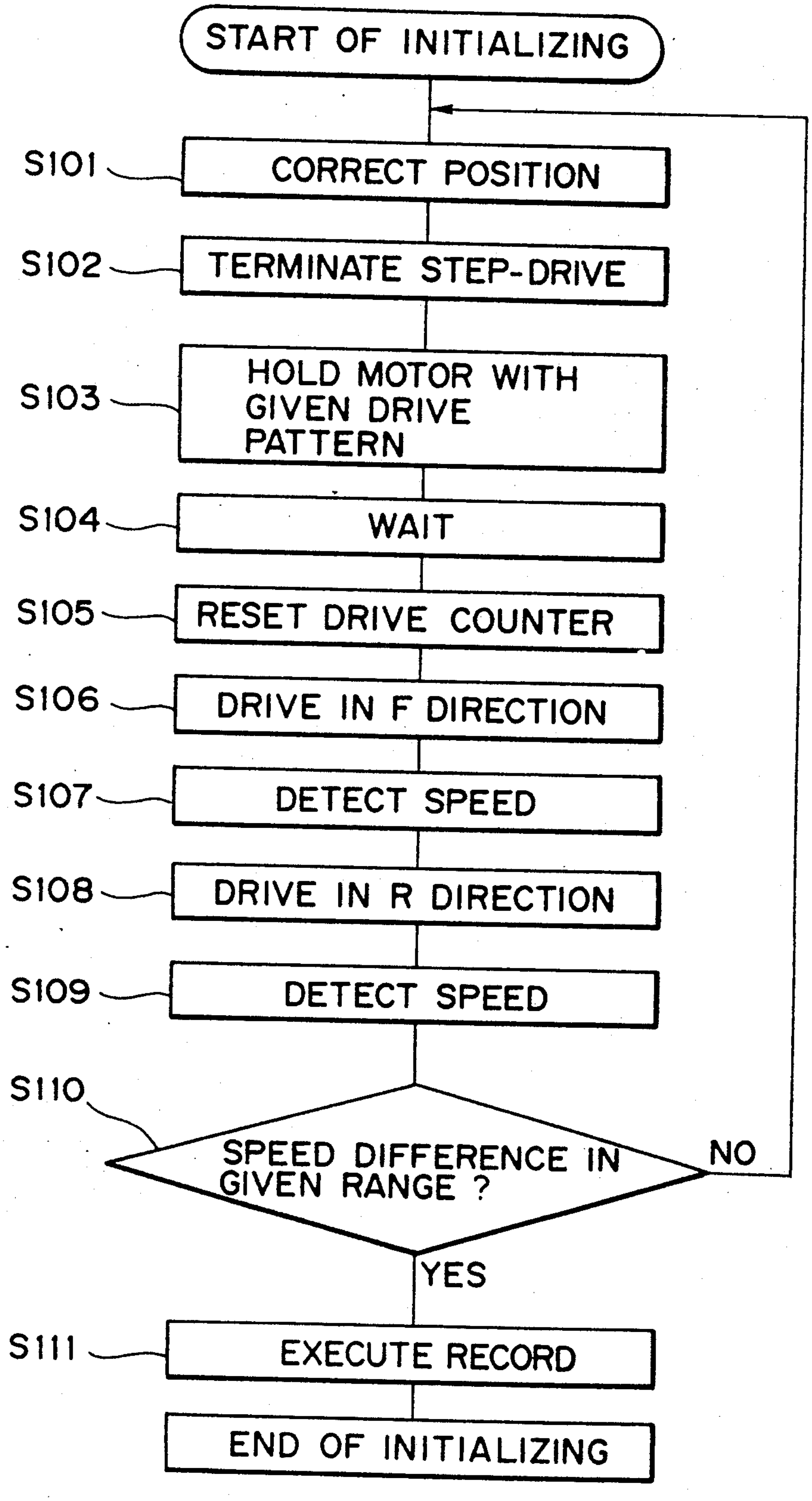
FIG. 10 is a flow chart showing the sequence of the initializing operation for the carriage driving motor according to the third embodiment.

FIG. 10 shows a flow chart for the initializing operation of the carriage driving motor according to the third embodiment. As mentioned above, since it is not known where the carriage is positioned when the power source is turned ON, first of all, the carriage must be moved to a position where the initializing operation can be performed without fail.

Incidentally, in the serial printer to which the present invention is applied, although the stepping motor 1 is controlled with the closed loop control fashion to act as the multiple pole brushless motor, it is possible to drive the stepping motor to perform the inherent function of the stepping motor itself. In order to move the carriage 2, the current change-over circuit 24 may include a stepping motor drive pattern generating circuit (not shown) incorporated therein, by which the motor 1 is driven in synchronous with the signal from the MPU 20. Alternatively, the MPU 20 may send the drive pattern to the current change-over circuit 24 to drive the motor. In this way, by incorporating both the function of the brushless motor and the inherent function as the stepping motor itself into the carriage driving motor, the carriage 2 can be moved to a position necessary for performing the initializing operation even before the initializing operation for the motor control is performed.

Next, the initializing process for registering the positions of the magnetic poles of the rotor with the positions of the magnetic poles of the encoder will be explained.

Incidentally, while the condition for registration of position was not described previously, in effect, such position is preferably selected to smoothly and desirably drive the motor. Here, in this embodiment, for example, by assuming that the change-over operation of the excitation currents is preferably performed when the center (position having the strongest magnetic force) of each magnetic pole of the rotor 14 coincides with the center of each magnetic pole of one of the stators 16*a*, 16*b*, i.e., when the driving torque is zero, the above-mentioned initializing operation is performed as follows:

That is to say, in FIG. 10, first of all, in a step S101, the motor is driven with a drive pattern of one-phase-on drive by one cycle or two cycles (in case of the one-phase-on drive, one cycle corresponds to four steps). This operation helps to release the carriage 2 if the latter is stopped at the dead point of the motor. Then, in a step S102, when the last step drive of the motor is completed, after the excitation condition is held for a while in a step S103 and step S104, the sequence goes to a step S105, where the value of the above-mentioned counter 24*a* controlling the change-over timing of the excitation currents is set to zero, thus shutting off the excitation current. Incidentally the reason why there remains a time duration between the last step and the clear of the counter is that the vibration of the rotor is diminished to be able to correctly position the rotor. Alternatively, such process may be performed with two-phase-on drive or with half-step drive. In such a case, the initial value of the counter is set to a predetermined value.

With such initialization, the magnetic poles of the rotor are coordinated with the magnetic poles of the encoder, and the process for the change-over timing of the excitation currents is also prepared. Incidentally, once the initializing operation has been performed, such coordinated relation is maintained so long as the printer is not powered OFF.

However, only from these procedures, it cannot be ascertained that the initializing operation of the motor 1 has been completed, and thus, it is not ensured that the carriage driving motor drives correctly, as mentioned above. Accordingly, the initialization confirming operation which forms one of characteristics of the present invention is performed in accordance with the following procedures:

That is to say, first of all, in a step S106, constant voltage is applied to a motor drive circuit (not shown) incorporated into the motor speed control circuit 23 with the closed loop control fashion to drive the motor 1, thus shifting the carriage to the direction F in FIG. 1. Incidentally, in this case, it is not necessary to control the speed of the carriage, because the rotational speed of the motor 1 is determined by the motor drive voltage and the load such as friction of the carriage and the like as similar as a conventional DC motor. Then, when the speed of the carriage (and, accordingly, the speed of the motor) becomes constant, the rotational speed of the motor 1 is measured (in a step S107). Incidentally, the rotational speed of the motor 1 can be detected by the time duration between the encoder pulses inputted from the encoder constituted by the disc 27 and the photo-interrupter 28.

Next, in a step S108, the carriage 2 is moved to the direction R with the same drive voltage as the mentioned above, and, in the same manner, the rotational speed of the motor 1 is measured in a step S109. Normally, since the coefficient of friction between the carriage 2 and the guide shafts 5*a*, 5*b* is constant regardless of the carriage moving directions, the load of the motor 1 is not changed in accordance with the rotational directions thereof, and the rotational speed of the motor will be constant regardless of the rotational directions of the motor. Thus, in a step S110, the motor speed for shifting the carriage to the direction F and the motor speed for shifting the carriage to the direction R are compared. And, if the difference in the speeds is in a predetermined range, it is judged that the change-over of the excitation currents is effected correctly, and the sequence goes to a next step S111, where the recording operation is executed. On the other hand, in the step S110, if it is judged that the difference is greater, it means that initialization is error, and, thus, the sequence returns to the step S101, where the initializing operation is performed again.

In this way, according to the present invention, the initializing operation of the carriage driving motor 1 can be positively performed, whereby it is possible to stably control the motor with the closed loop control fashion. Accordingly, the carriage control without vibration and uneven speed can be realized by simple circuits.

Incidentally, while the measurement of the rotational speed of the motor 1 can be obtained by measuring the time duration between the encoder pulses as mentioned above, the rotational speed of the motor may be measured by counting the encoder pulses for a predetermined time period.

Figure 11:
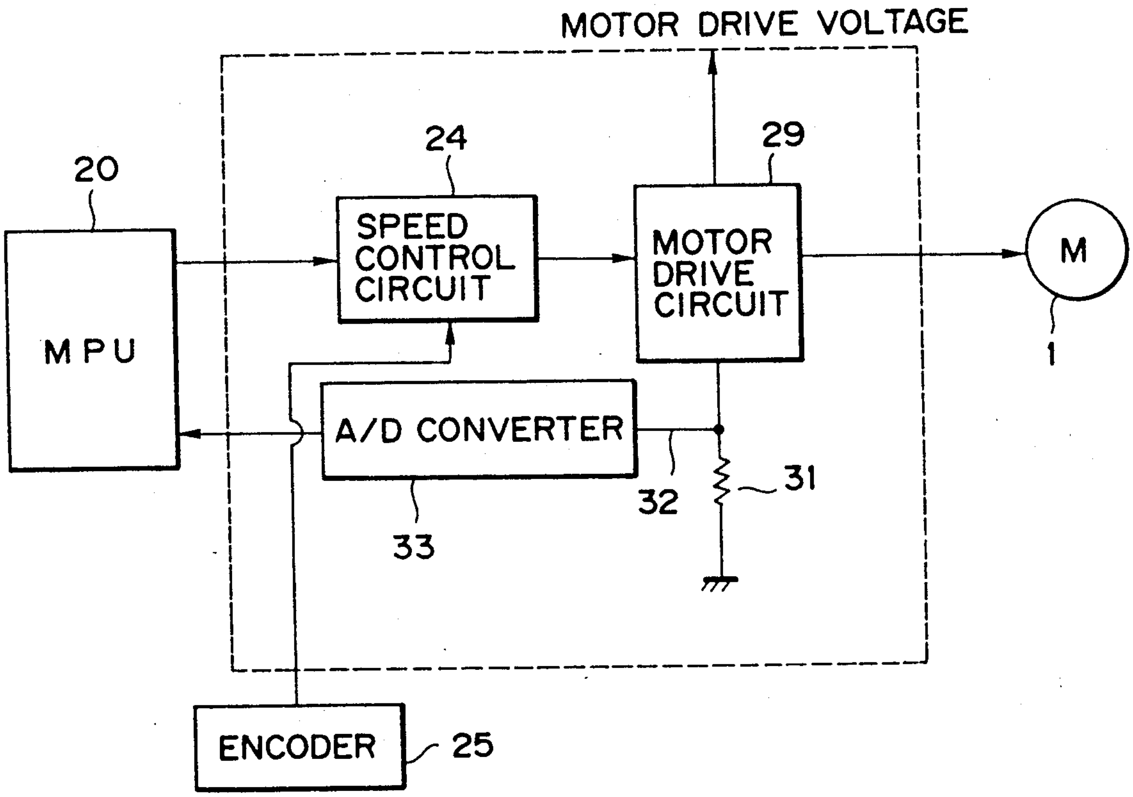
FIG. 11 is a block diagram of a motor control circuit according to an alteration of the third embodiment.

Next, an alteration of the third embodiment will be explained with reference to FIG. 11. In this alteration, a resistor 31 for detecting the current is provided in association with a motor drive circuit 23. In the third embodiment, it was judged whether the change-over of the currents was correct or not, by using the fact that the rotational speed can be determined by the drive voltage and the load even if the motor is uncontrollingly rotated.

However, in this alteration, the initialization condition is judged by the principle that, if the motor 1 is controlled to a certain constant speed, when the load is the same, the constant current flows. That is to say, if the change-over timing of the excitation current is different in accordance with the rotational directions of the motor, the initializing operation of the motor 1 cannot correctly be performed. More particularly, if the change-over of the excitation currents is effected earlier than the normal timing, the motor will be rotated faster, whereas if the change-over of the excitation currents is effected later than the normal timing, the motor will be rotated slower. Thus, in order to rotate the motor at the same speed in the opposite directions, when the change-over of the excitation currents is slower, larger current may supply to the motor 1, whereas, when the change-over of the excitation currents is faster, less current may be supplied to the motor. The values 32 of these currents are picked up, and are inputted to the MPU 20 through an A/D converter 33. Then, the MPU 20 compares the values of the currents in opposite directions with a predetermined value; if the difference between the values is in a predetermined range it is judged that the change-over of the currents is correctly performed regardless of the rotational directions of the motor. On the other hand, if the difference is out of the predetermined range regarding either rotational direction, the initializing operation is performed again.

Next, a fourth embodiment of the present invention will be explained, and, in particular, the difference between the fourth embodiment and the first embodiment will be explained.

Figure 12:
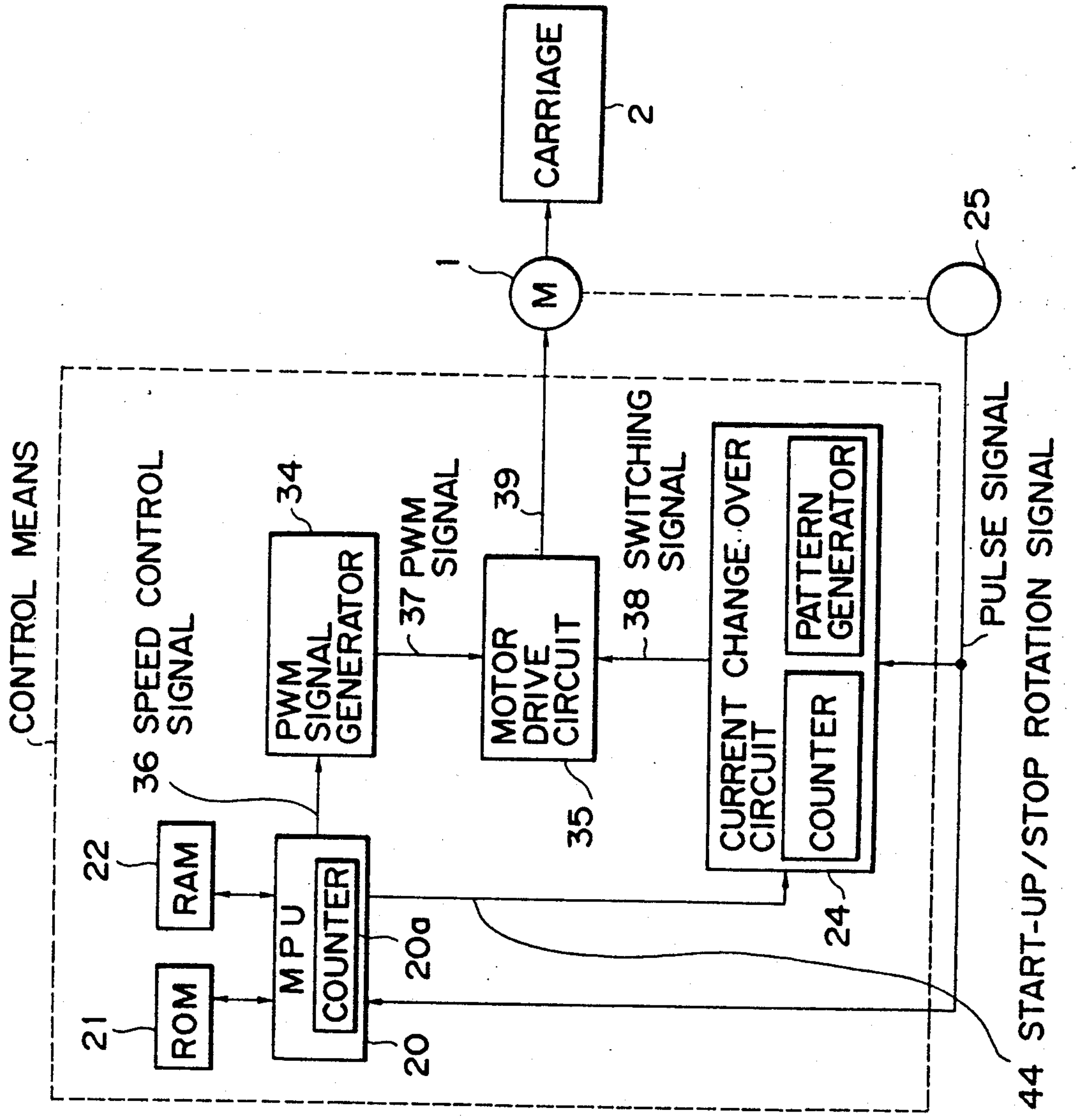
FIG. 12 is a block diagram showing the construction of a carriage driving mechanism according to a fourth embodiment of the present invention.

FIG. 12 shows a block diagram which is obtained by embodying the block diagram of FIG. 3. The MPU 20 controls the operation of driving sources of other mechanisms (not shown) of the printer, by using the RAM (random access memory) 22 as a data treating area, on the basis of the control programs as shown in FIGS. 4 and 10 and stored in the ROM (read only memory) 21, and also controls the operation of the carriage driving motor 1 for driving the above-mentioned carriage 2. To this end, the MPU 20 is designed to detect the position of the carriage 2 by counting the output pulses from the encoder 25 comprising the detection disc 27 and the photo-interrupter 28 by the use of an incorporated counter 20*a* constituted by hardware or software (not shown).

Further, the MPU 20 controls the rotational speed of the carriage driving motor 1 to the speed in the above-mentioned high speed mode or low speed mode, by means of a motor drive circuit 35 through a pulse width modulation (PWM) signal generator 34, and also controls the start, stop and rotational direction of the carriage driving motor 1 (and, accordingly, the start, stop and moving direction of the carriage 2) by means of the motor drive circuit 35 through the current change-over circuit 24 for changing over the excitation currents of the coils 15*a*, 15*b* of the carriage driving motor 1.

Such motor drive control is effected by closed loop control system comprising the carriage driving motor 1, encoder 25, MPU 20. PWM signal generator 34 and motor drive circuit 35, which will be explained hereinafter. The MPU 20 measures the time duration between the output pulses of the encoder 25 fixed to the rotor shaft 13 of the motor 1 by counting internal reference pulses by means of the counter 20*a*, thus detecting the rotational speed of the motor 1.

Next, the MPU 20 compared the actual (present) rotational speed of the motor with a predetermined command rotational speed, and outputs a speed control signal 36 in accordance with the comparison result. More particularly, when the actual rotational speed is slower than the command rotational speed, the output level of the speed control signal 36 is increased according to the difference in speed, whereas, when the actual speed is faster than the command speed, the MPU 20 decreases the output level of the speed control signal 36.

Figure 13:
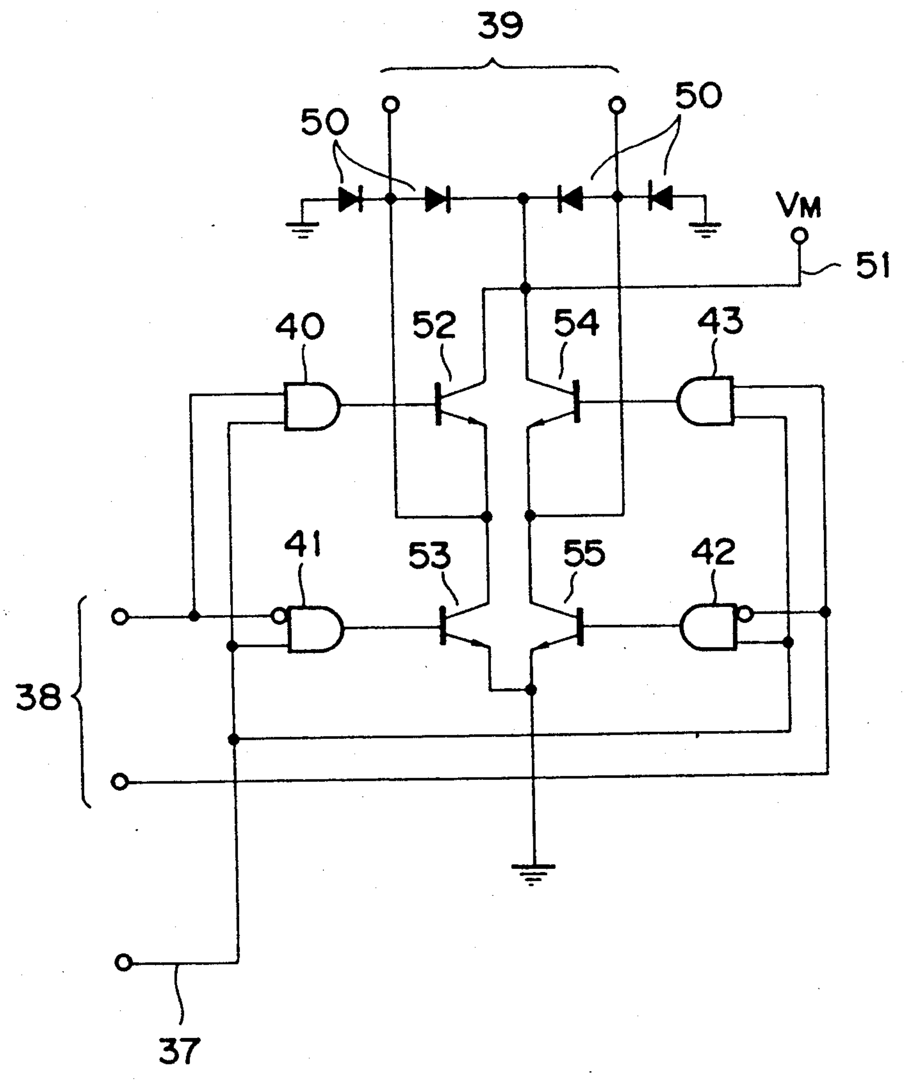
FIG. 13 is a circuit diagram of a motor drive circuit of FIG. 12.

The PWM signal generator 34 generates a pulse signal 37 having a duty ratio according to the output level of the speed control signal 36 of the MPU 20. That is to say, the PWM signal generator 34 generates the pulses having the larger duty ratio when the output level of the speed control signal 36 is high, and generates the pulses having the smaller duty ratio when the output level of the speed control signal 36 is low. The pulse signal 37 (referred to as "PWM signal" hereinafter) is inputted to gate circuits 40, 41, 42, 43 (FIG. 13) of the motor drive circuit 35. These gate circuits 40, 41, 42, 43 are so designed that they control the motor currents 39 flowing through the coils of the motor 1 by turning predetermined transistors 52–55 ON when both an output signal 38 of the current change-over circuit 24 and the PWM signal 37 are in an enable condition "H". Incidentally, the reference numeral 50 designates a flywheel diode.

Figure 14A:
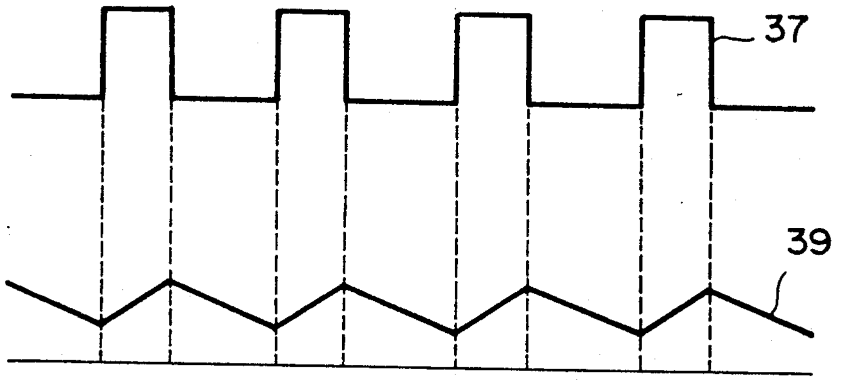
FIGS. 14A and 14B show motor current waves modulated by the circuit of FIG. 13.

Now, the PWN signal 37 normally has the frequency of the order of 15–30 KHz so that the noise due to the change-over of the excitation current cannot be heard by the human's ears. When the motor currents 39 are changed over with such frequency, the current 39 actually flowing through the motor will be as shown in FIG. 14A in accordance with the time constant of the coils, since, even after the motor is turned off, the electric energy accumulated in the coils 15*a*, 15*b* flows into the coils 15*a*, 15*b* again through the flywheel diode 50. That is to say, the average value of current variations due to ON-OFF of the transistors 52–55 corresponds to the current 39 flowing through the motor 1.

Figure 14B:
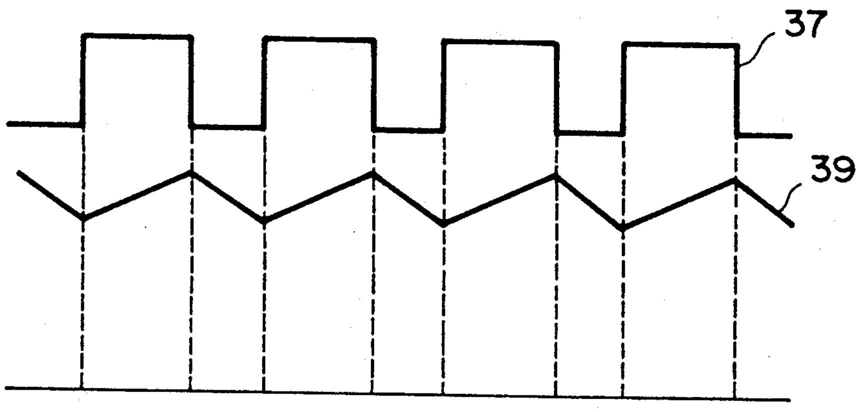
Figure 15:
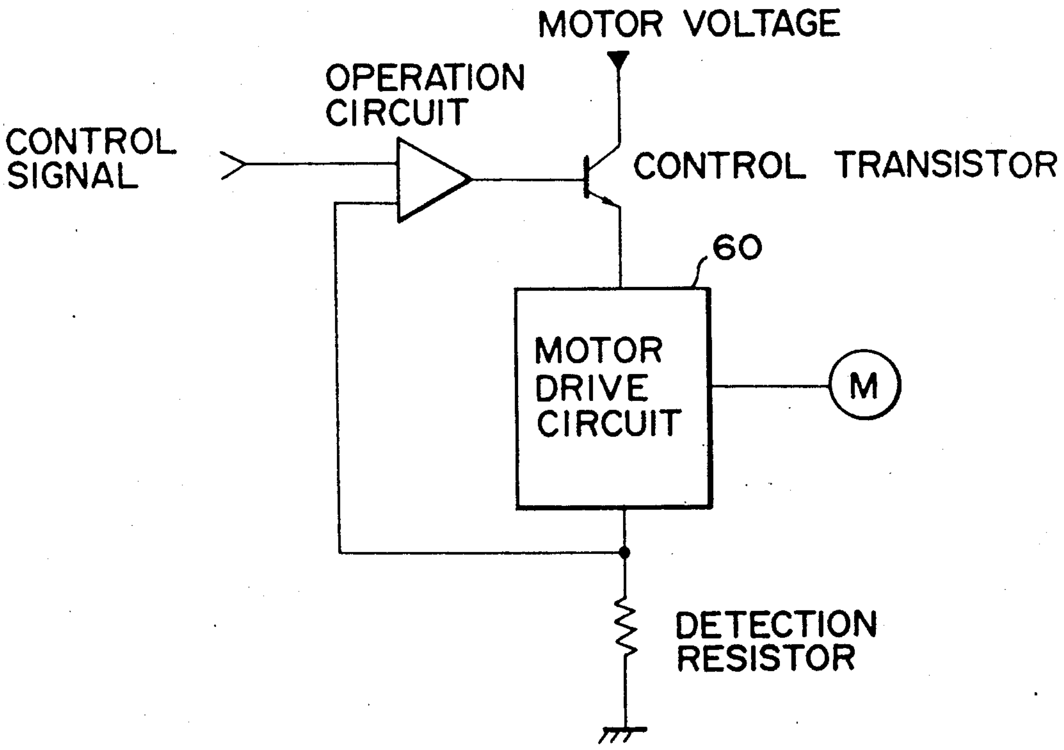
FIG. 15 shows a conventional motor current control circuit.

Accordingly, when the duty ratio of the PWM signal 37 is increased, the motor current 39 is also increased as shown in FIG. 14B, thereby increasing the rotational speed of the motor 1. On the other hand, when the duty ratio is decreased, the motor 1 is rotated slower. With the closed loop control system as mentioned above, the rotational speed of the motor 1 can be controlled to a predetermined value.

On the other hand, the current change-over circuit 24 initiates the above-mentioned change-over operation of the excitation currents in response to a start-up signal 44 inputted from the MPU 20, thus initiating the rotation of the carriage driving motor 1, and stops the carriage driving motor 1 in response to a stop signal 44.

Further, the current change-over circuit 24 according to the invention controls the change-over timing for the excitation currents of the coils 15*a*, 15*b* of the carriage driving motor 1 with the closed loop control fashion, in response to the detected outputs of the encoder 25. To this end, the current change-over circuit 24 includes a counter (not shown) by which the output pulses of the encoder 25 are counted, whereby, whenever the counted value coincides with a predetermined value, the excitation currents are changed over.

As mentioned above, in the illustrated embodiment, the current change-over circuit 24 for the carriage driving motor 1 is of the two-phase-on drive type wherein, for example, the currents are changed over by 48 times for each one revolution of the rotor 14, and the encoder 25 provides 288 output pulses for each one revolution thereof. Since whenever each pulse is outputted the rotor 14 is rotated by the same angle, if the excitation currents are changed over whenever the current change-over circuit 24 counts six (288÷48) pulses, the excitation currents can always be changed over at a predetermined timing where a predetermined relation between the positions of the magnetic poles of the rotor 14 and the positions of the magnetic poles of the stators 16*a*, 16*b* is always the same and is repeated per each predetermined angular position of the rotor. Thus, in this embodiment, the excitation currents are changed over whenever six pulses are counted.

Next, a control sequence for the initializing operation in this embodiment will be explained with reference to FIG. 10.

In this embodiment, in the above stepping drive (step S102) and the motor holding operation (step S103) in the above-mentioned initializing sequence, the voltage or current is restricted by the PWM signal 37. Incidentally, in this case, the motor drive circuit 35 and the motor current 39 are the same as mentioned above. Normally, since the stepping motor 1 is driven with the constant voltage, the PWM signal 37 in this case may have a constant value. That is to say, the current value determined by the duty ratio of the PWM signal 37, motor voltage 51 (FIG. 13) and motor resistance may be selected that the motor 1 can be rotated without being out of phase.

In practice, when the initializing operation is started and it is selected that the motor acts as the stepping motor, the MPU 20 outputs the speed control signal 36 by which the PWM signal generator 34 can output the pulse output (PWM signal) 37 having a predetermined duty ratio. Incidentally, in this case, microscopically, although the motor current 39 is varying, since the mechanical time constant of the motor 1 is greatly larger than the PWM frequency of the PW signal 37, which, thus, can be negligible the noise due to the vibration of the rotor 14 in response to the PWM signal does not occur.

With such initialization, the magnetic poles of the rotor 14 can be coordinated with the magnetic poles of the encoder 25, and the change-over timing operation can also be prepared. Incidentally, once the initializing operation has been performed, such coordinated relation is remained so long as the power source is not turned OFF.

In the last step of the initializing operation, it is ascertained whether the timing operation has been effected correctly (in the step S110). In effect, this procedure is performed by rotating the motor in opposite directions (in the steps S106, S108), and by judging whether there is dispersion in speed on the basis of the encoder signal (in the steps S107, S109, S110). If the dispersion in speed is below a predetermined value (normal value), the initializing operation is completed.

As mentioned above, according to the present invention, the initializing operation can be performed by the simple drive circuits, and it is possible to stably control the motor with the closed loop control fashion. Accordingly, carriage control with reduced vibration and even speed can be realized.

What is claimed is:

1. A recording apparatus comprising:

a recording head;

a carriage having said recording head mounted thereon;

a stepping motor for moving the carriage, said stepping motor having a rotor and coil;

detection means for detecting an angular position of the rotor of said stepping motor, the detection means generating a pulse signal for every predetermined angle of rotation of said rotor;

control means for counting the pulse signals from said detection means, detecting a position of said carriage in accordance with the pulse signals counted by said control means, outputting control signals for starting and stopping said carriage, and outputting an initializing signal;

current change-over means for counting the pulse signals from said detection means and changing over an excitation current supplied to the coil of said stepping motor in accordance with the pulse signals counted by said current change-over means to effect a closed loop control, said current change-over means also effecting a step motor drive of said stepping motor in response to the initializing signal from said control means, thereby said current change-over means bringing said rotor to a stable position and resetting the counted value to a reference value, starting change-over control of the excitation current in response to the start control signal from said control means and stopping the change-over control of the excitation current in response to the stop control from said control means.

2. A recording apparatus according to claim 1 further comprising a second detection means for generating a detection signal, said second detection means comprising a photosensor and a shield plate provided on said carriage, the detection signal being generated by shielding said photosensor with said shield plate.

3. A recording apparatus according to claim 1, further comprising a second detection means for generating a detecting signal, said second detection means comprising a switch, the detecting signal being generated by movement of said carriage to one end of a movable range thereof.

4. A recording apparatus according to claim 1, wherein said current change-over means has a step motor drive pattern generating circuit for effecting the step motor drive, said step motor drive pattern generating circuit operating a drive pattern for bringing said rotor to the stable position in response to said initializing signal.

5. A recording apparatus according to claim 1, wherein said recording head is an ink jet type recording head.

6. A recording apparatus comprising:

a recording head;

a carriage on which said recording head is mounted;

a stepping motor for moving said carriage, said stepping motor including a rotor and coil;

a first detection means for detecting whether said carriage is in a reference position within of a movable range thereof, said first detection means generating a detection signal when said carriage is in the reference position;

a second detection means for detecting an angular position of the rotor of said stepping motor, said second detection means generating a pulse signal for every predetermined angle of rotation of said rotor;

control means for counting the pulse signals from said second detection means, detecting a position of said carriage in accordance with the pulse signals counted by said control means, outputting control signals for starting and stopping said carriage, and outputting first and second signals for initializing; and current change-over means for counting the pulse signals form said second detection means, and changing over an excitation current supplied to the coil of said stepping motor in accordance with the pulse signals counted by said current change-over means, thereby effecting a closed loop control, said current change-overmeans also effecting a step motor drive of said stepping motor in response to the first initializing signal from said control means, said current change-over means bringing said rotor to a stable position and resetting the counted value of the pulse signals to a reference value, starting change-over control of the excitation current of the closed loop control in response to the start control signal from said control means and stopping the change over control of the excitation current of the closed loop control in response to the stop control signal, the current change-over means driving said stepping motor in response to the second initializing signal to move said carriage to the reference position.

7. A recording apparatus comprising:
- a recording head;
- a carriage having said recording head mounted thereon;
- a stepping motor for moving the carriage, said stepping motor including a rotor and coil;
- a first detection means for detecting whether said carriage is located at one end of a movable range thereof, said first detection means generating a detection signal when said carriage is located in the movable range;
- second detection means for detecting an angular position of the rotor of said stepping motor, said second detection means generating a pulse signal for every predetermined angle of rotation of said rotor;
- control means for counting the pulse signals from said second detection means, detecting a position of said carriage in accordance with the pulse signals counted by said control means, outputting control signals for starting and stopping said carriage, and outputting an initializing signal of said carriage;
- current change-over means for counting the pulse signals from said second detection means and controlling the change-over of an excitation current supplied to the coil of said stepping motor in accordance with the pulse signals counted by said current change-over means, the current change-over means effecting a step drive of said stepping motor so that said carriage is moved to the other end of the movable range when the detection signal is generated from said first detection means, then bringing said rotor to a stable position thereof in response to the initializing signal from said control means and resetting the counted value of the pulse signals to a reference value, starting the change-over control of the excitation current in response to the start control signal from said control means and stopping the change-over control of the excitation current in response to the stop control signal.

8. A recording apparatus according to claim 7, wherein said first detection means generates a non-detection signal when said carriage is not in the movable range, said current change-over means effecting the step motor drive of said stepping motor to move to said carriage towards the one end of the movable range when the non-detection signal is generated, bringing said rotor to a stable position thereof in response to the initializing signal from said control means and effecting an initialization to reset the counted value of the pulse signals to a reference value, and when the detection signal is generated, effecting initialization by moving said carriage toward the other end of the movable range.

9. A recording apparatus according to claim 7, wherein said current change-over means includes a counter for counting the pulse signals from said second detection means, the counter being reset to a reference value by said initializing signal.

10. A recording apparatus according to claim 7, wherein said second detection means includes a encoder which generates a pulse signal for every predetermined rotation of said rotor of said stepping motor.

11. A recording apparatus according to claim 7, wherein said recording head is an ink-jet type recording head.

12. A recording apparatus comprising:
- a recording head;
- a carriage on which said recording head is mounted;
- a stepping motor for moving said carriage, said stepping motor including a rotor and coil;
- detection means for detecting an angular position of the rotor of said stepping motor, said detection means generating a pulse signal for every predetermined angle of rotation of said rotor;
- control means for counting the pulse signals from said detection means, detecting a position of said carriage in accordance with the pulse signals counted by said control means, outputting control signals for starting and stopping said carriage, and outputting first, second and third signals for initializing, said control means comparing the speed of the stepping motor in one direction with the speed in the other direction, determining whether the difference in speed is in a predetermined range and reinitialization if the difference is outside the predetermined range;
- current change-over means for counting the pulse signals from said detection means and effecting change-over control of an excitation current supplied to the coil of said stepping motor in accordance with the pulse signals counted by said current change-over means, the current change-over means effecting a step motor control in response to the first initializing signal to bring said rotor to a stable position thereof and reset the counted value of the pulse signals to a reference value, driving said stepping motor to move said carriage in one direction in response to the second initializing signal, driving said stepping motor to move said carriage in the other direction in response to the third initializing signal, starting change-over control of the excitation current in response to the start control signal form said control means and stopping the change-over control of the excitation current in response to the stop control signal; and
- speed control means for controlling energization of said stepping motor in accordance with the numbered pulse signals generated by said detection means, said speed control means energizing said stepping motor to rotate in one direction in accordance with the second initializing signal and to rotate in the other direction in accordance with the third initializing signal.

13. A recording apparatus according to claim 12, wherein said speed control means controls the electric signal to said stepping motor in accordance with a time period of the pulse signals from said detection means.

14. A recording apparatus according to claim 12, wherein said speed control means controls the electric signal to said stepping motor in accordance with the number of pulse signals from said detection means generated in a given time.

15. A recording apparatus comprising:

a recording head;

a carriage on which said recording head is mounted;

a stepping motor for moving said carriage, said stepping motor including a rotor;

detection means for detecting an angular position of a rotor of said stepping motor, said detection means generating a pulse signal for every predetermined angle of rotation of said rotor;

control means for counting the pulse signals from said detection means, detecting a position of said carriage in accordance with the pulse signals counted by said control means, outputting control signals for starting and stopping said carriage, and outputting first, second, and third signals for initializing, said control means further for comparing the speed of the stepping motor in one direction with the speed of said motor in the other direction, determining whether the difference in speed is within a predetermined range and effecting an initialization again if the difference in speed is outside the predetermined range, said control means determining a speed of said stepping motor and outputting a speed control signal in accordance with a time period between the pulse signals from said detection means;

current change-over means for counting the pulse signals from said detection means and effecting change-over control of an excitation current supplied to said step motor in accordance with the counted value of the pulse signals, the current change-over means effecting a step motor drive of the stepping motor in response to the first initializing signal to bring said rotor to a stable position and to reset the counted value of the pulse signal to a reference value, driving said stepping motor to move said carriage in the one direction in response to the second initializing signal, driving said stepping motor to move the carriage in the other direction in response to the third initializing signal, and starting the change-over control of the excitation current in response to the stop control signal; and speed control means generating a pulse signal of duty ratio corresponding to the speed control signal from said control means, said speed control means driving said stepping motor in the one direction by a predetermined duty pulse in response to the second initializing signal and driving said stepping motor in the other direction by a predetermined duty pulse in response to the third initializing signal.

* * * * *

UNITED STATES PATENT AND TRADEMARK OFFICE
CERTIFICATE OF CORRECTION

PATENT NO. : 5,029,264

DATED : July 2, 1991

INVENTOR(S) : Noriaki Ito, et al.

It is certified that error appears in the above-identified patent and that said Letters Patent is hereby corrected as shown below:

COLUMN 2:

Line 3, change "o" to -- or --.

COLUMN 3:

Line 16, change "is" to -- are --.

COLUMN 5:

Line 37, change "is" to -- are --.
Line 50, change "is" to -- are --.

COLUMN 6:

Line 17, change "having" to -- have --.

UNITED STATES PATENT AND TRADEMARK OFFICE
CERTIFICATE OF CORRECTION

PATENT NO. : 5,029,264

DATED : July 2, 1991

INVENTOR(S) : Noriaki Ito, et al.

It is certified that error appears in the above-identified patent and that said Letters Patent is hereby corrected as shown below:

COLUMN 7:

Line 67, change "circuit 23" to -- circuit 24 --.

COLUMN 8:

Line 5, change "reaches" to -- has reached --.

Line 11, change "reaches" to -- has reached --.

Line 62, delete "in".

COLUMN 9:

Line 29, change "is" to -- are --.

UNITED STATES PATENT AND TRADEMARK OFFICE
CERTIFICATE OF CORRECTION

PATENT NO. : 5,029,264 Page 3 of 6

DATED : July 2, 1991

INVENTOR(S) : Noriaki Ito, et al.

It is certified that error appears in the above-identified patent and that said Letters Patent is hereby corrected as shown below:

COLUMN 10:

Line 61, change "tointerrupter 28" to -- to-interrupter 28 --.

COLUMN 11:

Line 10, delete "in".

COLUMN 12:

Line 10, change "as" (second occurrence) to -- to --.

Line 19, change "the" (second occurrence) to -- that --.

Line 37, change "is" to -- is in --.

CERTIFICATE OF CORRECTION

PATENT NO. : 5,029,264

DATED : July 2, 1991

INVENTOR(S) : Noriaki Ito, et al.

It is certified that error appears in the above-identified patent and that said Letters Patent is hereby corrected as shown below:

COLUMN 13:

Line 9, change "supply" to -- be supplied --.

Line 54, change "MPU 20." to -- MPU 20, --.

Line 61, change "compared" to -- compares --.

COLUMN 14

Line 21, change "PWN" to -- PWM --.

COLUMN 15

Line 22, change "that" to -- so that --.

Line 32, change "PW" to -- PWM --.

Line 33, change "negligible" to -- negligible, --.

Line 41, change "is remained" to -- remains --.

UNITED STATES PATENT AND TRADEMARK OFFICE

CERTIFICATE OF CORRECTION

PATENT NO. : 5,029,264

DATED : July 2, 1991

INVENTOR(S) : Noriaki Ito, et al.

It is certified that error appears in the above-identified patent and that said Letters Patent is hereby corrected as shown below:

COLUMN 16:

Line 6, change "signal;" to -- signal; and --.

Line 24, change "claim 1" to -- claim 1, --.

Line 33, change "detecting" to -- detection --.

Line 53, delete "of".

COLUMN 17:

Line 2, change "form" to -- from --.

Line 7, change "change-overmeans" to -- change-over means --.

Line 42, change "carriage;" to -- carriage; and --.

UNITED STATES PATENT AND TRADEMARK OFFICE

CERTIFICATE OF CORRECTION

PATENT NO. : 5,029,264

DATED : July 2, 1991

INVENTOR(S) : Noriaki Ito, et al.

It is certified that error appears in the above-identified patent and that said Letters Patent is hereby corrected as shown below:

COLUMN 17:

Line 65, delete "to" (second occurrence).

Line 66, change "towards" to -- toward --.

COLUMN 18:

Line 13, change "a" to -- an --.

Line 17, change "ink-jet" to -- ink jet --.

Line 38, change "reinitialization" to -- reinitializing --.

Line 56, change "form" to -- from --.

COLUMN 20:

Line 7, change "step" to -- stepping --.

Signed and Sealed this

Nineteenth Day of October, 1993

Attest:

BRUCE LEHMAN

Attesting Officer

Commissioner of Patents and Trademarks